United States Patent [19]

Suzuki

[11] Patent Number: 4,977,666

[45] Date of Patent: Dec. 18, 1990

[54] METHOD OF FORMING A COIL ON A CORE

[76] Inventor: Yasuyuki Suzuki, Saitama, Japan

[73] Assignee: Sony Corporation, Tokyo, Japan

[21] Appl. No.: 387,153

[22] Filed: Jul. 31, 1989

[30] Foreign Application Priority Data

Aug. 15, 1988 [JP] Japan .................. 63-203021

[51] Int. Cl.$^5$ .................. G11B 5/42; H01F 7/06
[52] U.S. Cl. .................. 29/603; 29/605; 336/192; 360/123
[58] Field of Search .................. 29/603, 605, 606; 360/123; 336/192, 150, 224, 222

[56] References Cited

U.S. PATENT DOCUMENTS 2,864,064 12/1958 Heaton .................. 336/222 X
4,847,984 7/1989 Rossi et al. .................. 29/603

FOREIGN PATENT DOCUMENTS 0198560 10/1986 European Pat. Off. .
1076576  6/1964 United Kingdom .
1222979  2/1971 United Kingdom .
2164482  3/1986 United Kingdom .

Primary Examiner—Carl E. Hall
Attorney, Agent, or Firm—Ronald P. Kananen

[57] ABSTRACT

In a method for forming a coil and a coil formed by the method, a first wire having a thick insulating coating is inserted into a hole of a workpiece and wound around a peripheral surface of the workpiece to form a first winding layer, and a second wire having a thin insulating coating is continuously wound around the first wire to form a second winding layer so that a coil apparatus is formed. A junction between the ends of the first wire and the second wire serves as an intermediate tap for the coil apparatus.

3 Claims, 2 Drawing Sheets

METHOD OF FORMING A COIL ON A CORE

BACKGROUND OF THE INVENTION (1) Field of the Invention

The present invention relates to a method for wiring to form a coil and a coil apparatus formed thereby, in which a wire is inserted into a hole of a workpiece, such as a cove, and is wound around the workpiece to form the coil.

(2) Description of the Background Art

For example, when a magnetic disc read or write head is manufactured, it is necessary to form a coil with wire wound around the core of the head. The wire is inserted into a small hole formed in the core and, then, the wire is wound around the core to produce the winding. The outer surface of the wire s formed of an enamel-coated insulating material, whereby electrical leakage can be prevented.

However, if the insulating coating of the wire is damaged due to contact of the insulating coating with an edge of the core constituting the workpiece, electrical leakage occurs between the wire and workpiece. To prevent such leakage, the possible number of turns which are inserted into the small hole and wound around the core must be limited if the thickness of the enamel-coated insulating material is made thicker.

To eliminate such leakage problems, tape has been wound on a corner of the workpiece and the winding is carried out thereon. However, the small hole through which the wire is inserted becomes smaller due to the thickness, width, and/or cross sectional area of the tape, and the possible number of turns of the winding must again be limited. In addition, since a process of winding the tape is added, the total cost of manufacturing the coil apparatus is increased. In addition, when the wire is softly or gently wound around the core (work) under light pressure in order to weaken friction between the wire and the edge, the possible number of turns of the winding becomes reduced. Another solution may be considered in that the edge formed on each corner of the work may be chamfered or polished to produce a curvature. However, this method is difficult to put into practice in terms of processing technology and practical expenditure.

SUMMARY OF THE INVENTION

It is an object of the present invention to provide a method of wiring to form a coil and a coil apparatus which does not require preprocessing for a workpiece on which a coil is to be formed and also prevents electrical leakage between the workpiece and wire. It is a further object of the invention to provide a method and apparatus which allow the greatest possible number of turns of winding to be disposed on the workpiece and inserted into an inserting hole of the workpiece.

The above-described objects can be achieved by providing a method for forming a coil, comprising the steps of: (a) inserting a first wire, having an insulating coating of a first thickness into a hole of a workpiece; (b) winding the first wire on the outer peripheral surface of the workpiece; and (c) continuously winding a second wire having an insulating coating of a second thickness thinner than the first wire over the first wire to form a coil.

The above-described objects can also be achieved by providing a coil apparatus comprising: (a) a first wire, having a first thickness, inserted into a hole provided on a workpiece, and wound on a peripheral surface on the workpiece; and (b) a second wire having a second thickness thinner than the first wire and wound on the first wire, the second wire being connected to an end of the first wire at a junction thereof.

The above-described objects can also be achieved by providing a method for forming a coil for a magnetic disc read/write device, comprising the steps of: (a) inserting a first wire, having an insulating coating of a first thickness into a hole of a core of the magnetic head; (b) winding the first wire on the peripheral surface of the core; and (c) continuously winding a second wire having an insulating coating of a second thickness thinner than the first wire over the first wire to form the coil.

DETAILED DESCRIPTION OF THE PREFERRED EMBODIMENT

Reference will hereinafter be made to the drawings in order to facilitate a better understanding of the present invention.

Figure 2:
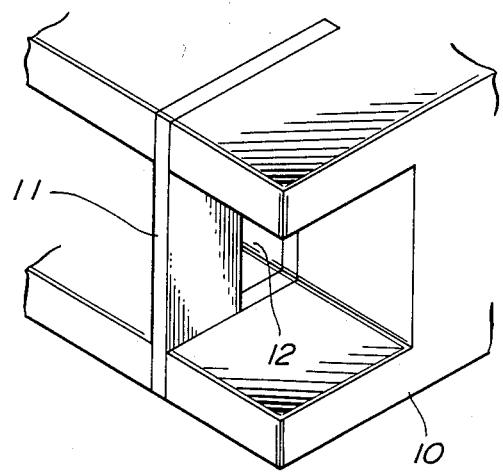
FIG. 2 is an outer perspective view of a magnetic head before wiring is executed in accordance with the present invention.

FIG. 2 shows a magnetic head on which a coil is to be formed, the coil being formed in accordance with the method for wiring according to the present invention.

The magnetic head 10 shown in FIG. 2 is in a state where no winding has been carried out. The head 10 comprises a core 11, the core 11 having a small hole 12. A wire is inserted into the small hole 12, the wire being wound on the core 11 to form a coil as a magnetic head 10 for a disc read/write device.

A method for wiring to assemble the magnetic head 10 will be described below with reference to FIG. 3.

Figure 3:
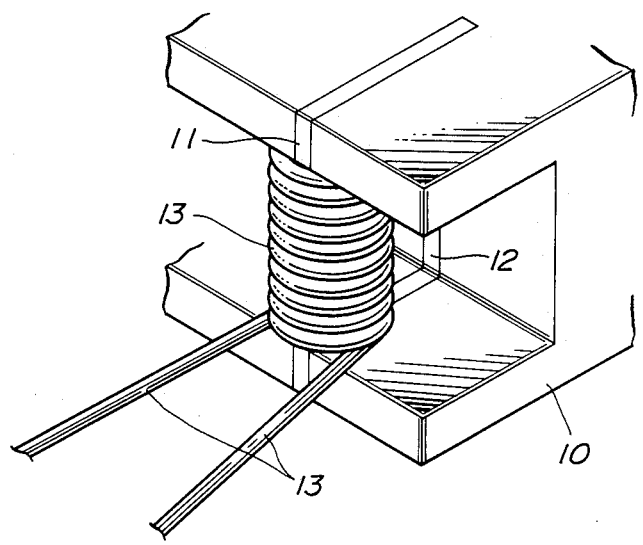
FIG. 3 is an outer perspective view of the coil apparatus shown in FIG. 1, in which a wire whose inner portion has a thick insulating coating is wound.

First, a wire 13 having a thick insulating coating is wound around the core 11, as shown in FIG. 3.

In this step, the wire 13 is wound around the core 11, with the wire 13 inserted into the hole 12 by means of a hook (not shown). The hook and winding apparatus are exemplified by a United States patent application filed on the same date titled Method and Apparatus for Winding Wire To Form Coil Using Hook (the disclosure of which is hereby incorporated by reference).

Figure 1:
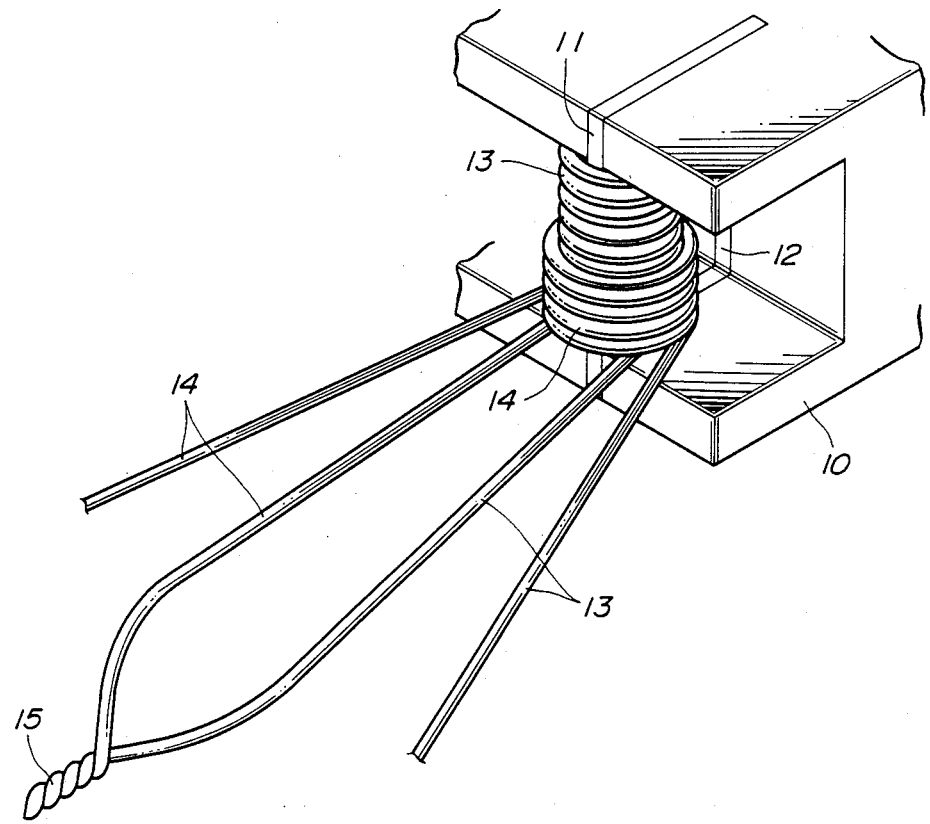
FIG. 1 is a perspective view of an essential part of a coil apparatus manufactured in accordance with a method for wiring according to the present invention.

After at least the exposed surface of the core 11 is covered with the wire 13 having the thick insulating coating, another wire 14 having a thin insulating coating is wound thereon, as shown in FIG. 1.

Thereafter, an end lead of the innner wire 13 having the thick insulating coating is connected to an initial end of the outer wire 14 having the thin insulating coating at a junction denoted by 15, as shown in FIG. 1. It is noted that the junction denoted by 15 serves as an intermediate tap of the assembled coil apparatus.

As described above, in the method for wiring according to the preferred embodiment, the part of the coil at which the wire directly contacts the core 11 is wound with the wire 13 having a thick insulating coating. Therefore, the enamel-coated insulating portion of the wire suffers little damage through contact with the edge portions of the core 11 so that electrical leakage between the wire 13 and core 11 can be prevented.

In addition, since the wire 14 having a thin insulating coating is wound around the wire 13 having a thick insulating coating, it becomes possible to increase the number of windings around the core with the wire 13 inserted nto the hole 12 first, and the thinner wire 14 inserted thereafter.

Furthermore, preprocessing such as adhering tape onto the core 11 is not required. Consequently, a maximum number of the wire turns can be achieved, utilizing the maximum area of the hole 12, and electrical leakage problems can be eliminated. It is natural that since the junction 15 of both wires 13 and 14 serves as an intermediate tap for the coil, a special intermediate tap need not be installed.

It is noted that although, in the preferred embodiment, the present invention is applied to a method of forming a coil and the apparatus formed by the coil (a head for a magnetic disc read/write device), the present invention is applicable to various kinds of windings besides the coil apparatus described in the preferred embodiment.

As described hereinabove, according to the present invention, wire having a thick insulating coating is wound on the portion of a workpiece at which the wire directly contacts the workpiece and thereafter wire having a thin insulating coating is wound on the wire having the thick insulating coating. Hence, electrical leakage between the wire(s) and workpiece can be prevented due to the thick insulating coating of the former wire contacting the workpiece. In addition, the number of turns can be increased due to the use of thinly (thin enamel insulation) coated wire. Furthermore, no special preprocessing for the workpiece is needed.

It will be fully appreciated by those skilled in the art that the foregoing description is made in terms of the preferred embodiment and that various changes and modifications may be made without departing from the scope of the present invention which is defined by the appended claims.

What is claimed is:

1. A method for forming a coil, comprising the steps of:
    (a) inserting a first wire having an insulating coating of a first thickness into a hole of a workpiece;
    (b) winding the first wire in convolution around a peripheral surface of the workpiece so that a portion of each convolution of the first wire extends through the hole; and
    (c) continuously winding onto the convolution of the first wire and in convolutions around the peripheral surface of the workpiece a second wire having an insulating coating of a second thickness, said second thickness being smaller than said first thickness.

2. A method for forming a coil as set forth in claim 1, further comprising connecting an end of the second wire to an end of the first wire.

3. A method for forming a coil for a magnetic disc read/write device, comprising the steps of:
    (a) inserting a first wire having an insulating coating of a first thickness into a hole in a core of a magnetic head;
    (b) winding the first wire in convolution around a peripheral surface of the core so that a portion of each convolution of the first wire extends through the hole; and
    (c) continuously winding on the convolutions of the first wire and in convolutions around the peripheral surface of the core a second wire having an insulating coating of a second thickness, said second thickness being smaller than said first thickness.

* * * * *